(No Model.)
J. ASPDEN
FILTER.
No. 417,766.
Patented Dec. 24, 1889.
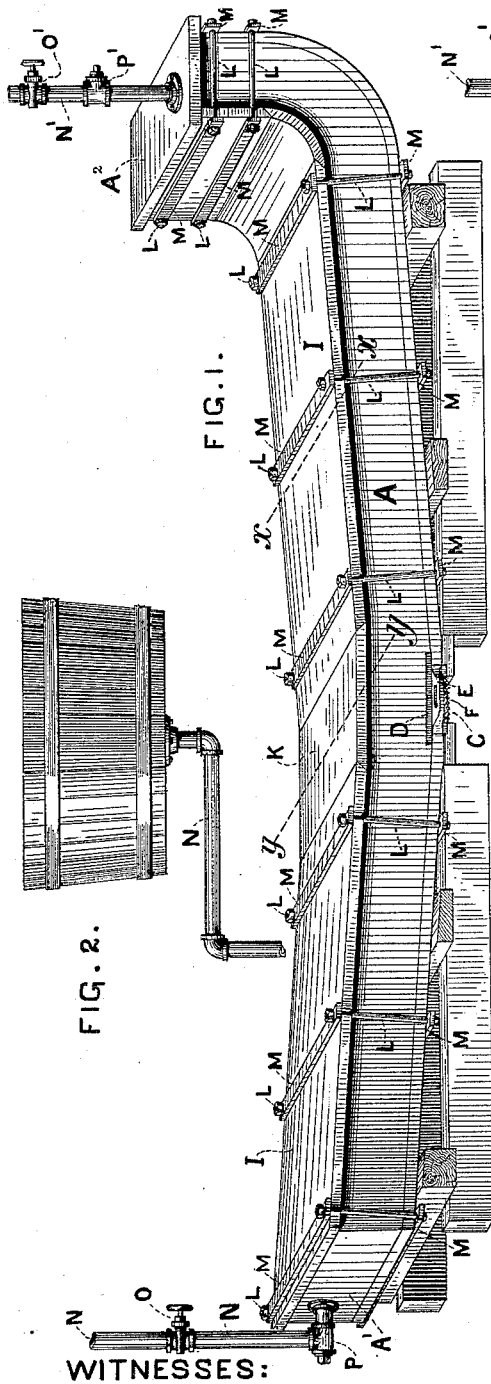
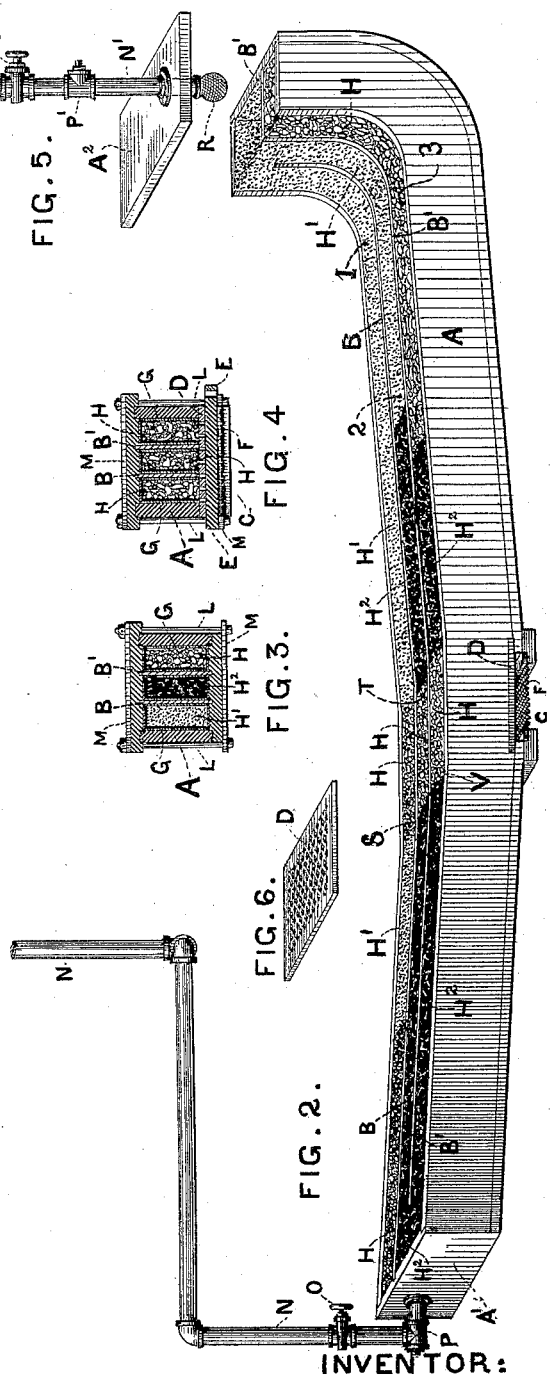
WITNESSES:
INVENTOR:
James Aspden
N. PETERS, Photo-Lithographer, Washington, D. C.

UNITED STATES PATENT OFFICE.

JAMES ASPDEN, OF CAMDEN, NEW JERSEY.

FILTER.

SPECIFICATION forming part of Letters Patent No. 417,766, dated December 24, 1889.

Application filed November 19, 1888. Serial No. 291,251. (No model.)

*To all whom it may concern:*

Be it known that I, JAMES ASPDEN, a citizen of the United States, residing at Camden, in the county of Camden and State of New Jersey, have invented certain new and useful Improvements in Filters, of which the following is a specification.

My invention relates to that class of filtering devices in which the liquid to be filtered is caused to flow through alternate strata of materials varying in their character of porousness, degree of subdivision, and density, with the object of freeing the said liquid of such organic or inorganic impurities as might be held in suspension therein.

Heretofore filters of ordinary construction have served the purpose for which they were designed sufficiently well for a limited period; but owing to their cumbersome structure and the difficulty and expense of cleaning the same, when once they have become clogged with impurities, their usefulness has been almost, if not entirely, impaired.

The object of my invention is to provide a filter which will combine the advantages of cheapness of first cost, compactness of structure, and efficiency with those afforded by great facilities for cleansing, or, rather, regenerating, the filtering materials which it contains, so that they shall be restored to their original absorbing power whenever their surcharged condition warrants doing so, and with the least expenditure of time and labor.

To this end my improvements consist in an elongated horizontal trough, depressed at or near its center, and having one of its extremities turned upward in a vertical position, as and for a purpose to be hereinafter more fully set forth, the said trough being subdivided longitudinally by means of partitions overlapping each other into compartments communicating one with the other and forming a continuous convoluted channel, with its inlet at the lower end of the trough and its outlet at the vertical extremity of the same, said trough being provided with a transversely-sliding trap or gate at its lowest or depressed part, said trap or gate being protected by a perforated plate. The inlet and outlet pipes are provided with stop cocks or valves, and likewise with means for connecting readily with other pipes, for the purpose of reversing the normal direction of the current, with the object of cleansing the filter when the latter has become saturated with impurities. The trough is filled with suitable filtering materials, varying in their nature, distributed in alternate layers or sections. The interior of the trough throughout its entire length is lined with soft spongy material, and a close-fitting lid or cover, susceptible of easy removal in whole or in part, is secured over the trough by means of bolts and transverse plates, thus forming or completing the conduit and its convolutions.

The nature of my improvements and the manner in which they are to be carried out will be understood, reference being had to the accompanying drawings, in which—

Figure 1 is an exterior elevation in perspective. Fig. 2 is a similar elevation with the cover removed, showing the interior arrangement of the filter. A tank or reservoir to indicate the source of supply is connected by a pipe, which is broken away to make room for the preceding figure. Fig. 3 is a transverse vertical section through the plane $x$ $x$ of Fig. 1. Fig. 4 is a similar section through $y$ $y$ of Fig. 1. Fig. 5 is an elevation in perspective of the discharge end of the filter detached, showing wire guard for outlet-pipe; and Fig. 6 is a detail view, in perspective, showing perforated protecting-plate of trap.

The drawings represent the form of filter as applied upon a large scale for filtering the entire water-supply of a dwelling, factory, or ship; but the same arrangement may be utilized on a much-reduced scale without interfering with or departing from the principle of construction involved which constitutes my invention.

A horizontal trough A, preferably constructed of wood, is depressed at or near its center and turned up in a vertical direction at its discharging extremity. It is subdivided into any number of longitudinal compartments by means of partitions B B'. These separating-diaphragms do not extend the entire length of the trough A, but come in contact alternately with either end of the trough. Thus the partition B, forming a close joint with the inlet end A' of the trough A, only extends to within, say, about a foot from the outlet end A², while the partition B', which forms a close joint with the outlet end A², terminates at a similar distance from the inlet end A', thus forming, when the lid is bolted into place, a continuous convoluted conduit, commencing at A' and terminating at A². The trough is depressed at or near its center, and a transverse opening is left in its bottom at C, said opening extending entirely across the trough and beneath all the compartments. The opening at C is guarded by a perforated plate D, beneath which slides the closely-fitting water-tight trap or gate E, which is normally closed, as shown at E, Fig. 1, and partially or entirely withdrawn when the trough is to be cleansed, leaving the opening C, as shown, Fig. 2. Beneath the trap E, and separated therefrom by a narrow interval, I stretch a netting F, whose function is to arrest any particles of charcoal or sand or gravel that might escape through the perforated plate. The trough is turned up vertically at its discharging extremity to afford a greater resistance to the outflowing of the impurities or of portions of the filtering materials.

The trough A rests upon a suitable structure at a sufficient distance from the ground or floor to allow of a pan being introduced beneath the opening C, in order that it may receive the impurities discharged from the filter during the cleansing or regenerating process.

I line the sides of the trough with some soft yielding material, (shown at G G, Figs. 3 and 4,) preferably of cloth, flannel, or felt, with a view to filling up the interstices between the flat sides of the trough and the granular filtering materials with which I fill the entire vacant space within the trough, which consists of gravel H, sand H', and charcoal H², arranged preferably as shown at Fig. 2, although the nature of the filtering materials and order of their distribution may be varied to suit circumstances and the character of the liquid to be filtered, the essential point being, however, that the gravel H should occupy the inlet and outlet portions of the conduit and also that portion of the compartments which overlies the perforated plate D and cleansing-trap E, overlapping the same on each side, the distribution of the sand and charcoal being made in the intervening spaces, as shown, Fig. 2, or in alternate sections of charcoal and sand or sand and charcoal of shorter lengths.

The cover or lid I is secured to the trough forming a water-tight joint, by means of bolts L L L, &c., and transverse horizontal overlapping plates M M M, &c. The central part of the lid or cover I consists of a piece K, which slides laterally in a dovetailed groove formed by the edges of the cover and is held in place by them. It is situated directly over the trap and can be slid out for the purpose of cleaning the gravel lying upon the perforated plate D, without otherwise disturbing the cover of the trough. The inlet-pipe N is provided with a stop-cock O and a three-way connection P, into which a steam or hot water pipe or hose can be readily screwed, and a similar arrangement exists at the outlet-pipe N', cock O', and connection P' for a similar purpose, the outlet-pipe N' being further provided with a rose or perforated ball R, for the detention of such particles of sand or charcoal as might have escaped through the stratum of gravel H.

The operation of my filter is substantially as follows: The stop-cocks O and O' having been opened, the flow of water or other liquid to be filtered takes place, following the convolutions of the conduit through the various strata of filtering material forward and backward until the liquid emerges through the discharge-cock O' in a purified condition, the impurities having been caught up by the intervening filtering material. This process, being common to nearly all filtering devices, need not further be enlarged upon, the main advantage of my filter over others apart from its length consisting in the facility and effectiveness of the means employed to thoroughly cleanse and regenerate or entirely remove and renew the filtering materials. I will proceed to describe the *modus operandi* of the same. Frequently it will be found necessary only to slide out the piece K of the cover I and withdraw the trap-gate E, when a stream of hot water directed upon the gravel overlying the latter will cleanse the same, the impurities flowing out below. When, however, it is deemed necessary to thoroughly regenerate the entire filter, the piece K is left in place, the stop-cocks O and O' are closed, hose conveying hot water under pressure are connected at either P or P', and here the peculiar advantages presented by the mode of construction adopted in my filter become obvious. Hot water under pressure being applied at P, the trap-gate E is gradually drawn forward until its rear edge is even with the partition B, allowing the hot water charged with impurities to escape through the opening thus produced beneath compartment 1, after having thoroughly cleansed the filtering materials between the point of inlet and the point S in compartment 1. In order to cleanse the material between the points S and T of compartments 1 and 2, the trap-gate F is pushed back until its front edge is flush with partition B, and finally, by drawing forward the trap-gate F until its front edge is flush with the partition B', the flow of the hot or purifying liquid is caused to extend throughout the entire filtering materials between the inlet P and the point V of compartment 3. By applying the hot water under pressure at P' and reversing the process the cleansing operation is completed. By repeating the process once or twice, applying the hot water at either P or P' alternately, the filtering materials are restored to their original power of absorption. Finally, when so deemed necessary, the entire cover may be removed and the filtering materials be subjected directly to a stream of hot water from a hose, the trap-gate having been previously opened, or else may be entirely removed and replaced by fresh materials.

I am aware that filters have been constructed of an elongated form and containing filtering materials of different character disposed in successive and alternate layers, and that such filters have been so constructed as to be susceptible of being cleansed by reversing the direction of the current of the liquid flowing through them. I do not claim, broadly, such a disposition; but What I do claim, and desire to secure by Letters Patent as my invention, is—

1. In a filter, the combination of the elongated trunk A, depressed at or near its center and subdivided into longitudinal communicating compartments, and the perforated plate D, and trap-gate E, said perforated plate D being placed at the bottom of said depression and above said trap-gate E, all substantially as and for the purposes set forth.

2. In a filter, the combination of the elongated trunk A, depressed at or near its center and subdivided into longitudinal communicating compartments, and the perforated plate D, trap-gate E, and wire-netting F, said plate, trap-gate, and netting being placed at the bottom of said depression, substantially as and for the purposes set forth.

3. A filtering device consisting of an elongated trunk or box subdivided by means of longitudinal partitions into compartments communicating one with the other and forming a continuous passage filled with filtering materials, having an inlet at one end and discharge at the other and having a trap and trap-gate E, underlying all of the compartments of the filter, as described and shown.

4. A filtering device consisting of an elongated trunk or box A, subdivided into longitudinal compartments communicating one with the other and forming a single continuous passage or conduit filled with filtering materials, said trunk or box being slightly depressed at or near its center and having at the point of depression a trap and trap-gate E, underlying all the compartments forming the conduits, as described and shown, and for the purpose set forth.

5. A filtering device consisting of an elongated trunk A, with communicating compartments and having a trap and trap-gate E, and sliding piece K, as described and shown, and for the purpose set forth.

6. A filtering device consisting of an elongated trunk or box horizontal at its inlet end and upwardly vertical at its discharging end, said box being depressed at or near its center and having its upper side in the form of a removable cover or lid and provided with means for securing the same, the sliding piece K, perforated plate D, trap-gate E, and wire-netting F, the separating-partitions B B', forming compartments 1 2 3, communicating one with the other and constituting a continuous conduit, serpentine in its character, whose folds lie parallel to each other and on the same horizontal plane, the inlet and outlet pipes N N', provided with the stop-cocks O O' and connections P P', respectively, the outlet-pipe N', having furthermore the rose R, as described and shown, and for the purpose set forth.

JAMES ASPDEN.

Witnesses:
J. HENRY McINTYRE,
JAMES SADLEIR.